T. J. Hall,
Plow Coulter.

No. 12,627.  Patented Apr. 3, 1855.

UNITED STATES PATENT OFFICE.

THOMAS J. HALL, OF TAWAKANA HILLS, TEXAS.

IMPROVEMENT IN PLOWS.

Specification forming part of Letters Patent No. 12,627, dated April 3, 1855.

*To all whom it may concern:*

Be it known that I, THOMAS J. HALL, of Tawakana Hills, in the county of Limestone and State of Texas, have invented certain new and useful Improvements in Rotary-Disk Cutters for Plows; and I do hereby declare the following to be a full, clear, and exact description of the same, reference being had to the accompanying drawings, making a part thereof, in which—

Figure 2:
Figure 1:
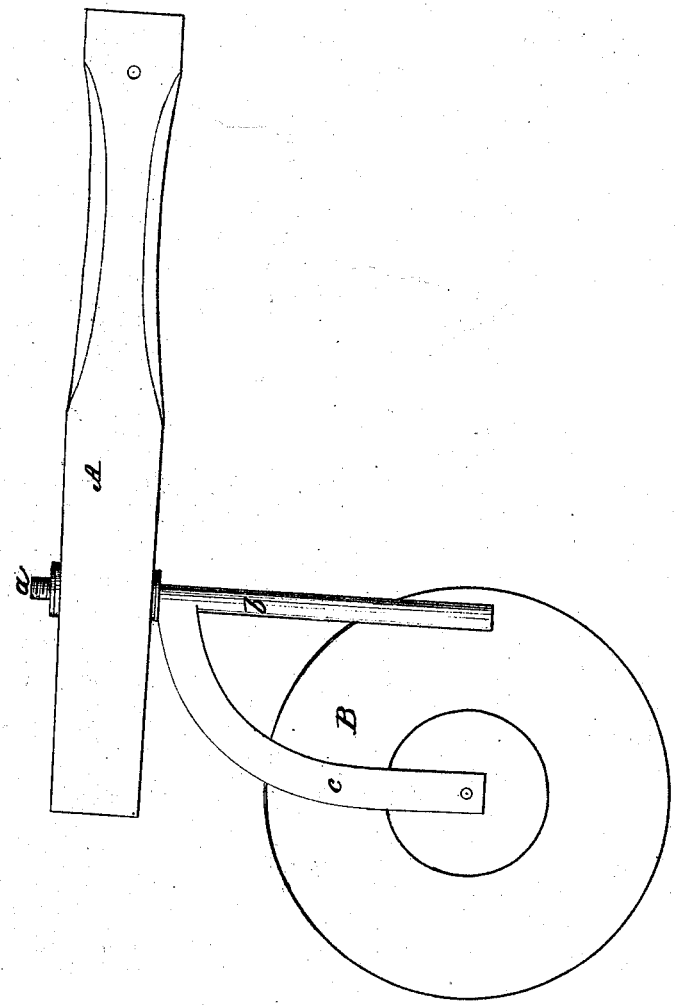

Figure 1 represents a side view, and Fig. 2 an end view, of the apparatus.

The nature of my invention consists in so hanging the cutter to the plow as that it may swivel in the beam and be supported by guides or arms near its edge, so as to follow the direction of the point of the beam.

To enable other skilled in the art to make and use my invention, I will proceed to describe the same with reference to the drawings.

A represents the beam of a plow, through which passes the shank *a* of a forked rod or shaft, *b*, said shank being so connected to the beam as to freely swivel therein.

B is a steel disk, hung on the curved arms *c*, (one only being seen in the side view.) These arms *c* are attached to and form a part of the shaft or rod *b*, and the wheel or cutting-disk B is so hung in said arms as that it shall slightly project through between the forks of the rod *b*, as seen in the drawings. By thus swiveling the rod and the cutter or disk to the beam said cutter will follow the point of the beam whichever way said point may be turned, the rear part of the wheel serving as a rudder or directrix to its following the point of the beam.

In cutter-wheels as at present arranged, having their stocks or supports immovably fixed in the beam, the plow cannot be run in a curved line without throwing it out of the ground and the wheel also. Otherwise the side draft would wrench the wheel from its supports. By my arrangement, the cutter-wheel acting somewhat like a caster, the plow may be turned round with the disk in the ground, and it will follow every motion of the beam.

This form of cutter may be used on any plow and should be set just in advance of the point of the colter or share, its advantage being in heavy sods to divide the roots and allow the plow to be easily kept in its furrow.

Having thus fully described the nature of my invention, I would state that I do not claim a cutting-wheel in connection with a plow, as this has been done repeatedly; but

What I do claim as new, and desire to secure by Letters Patent, is—

The so hanging of the cutter to the beam as that it may swivel therein, in combination with the supports at the edge of the wheel substantially as set forth and described.

THOS. J. HALL.

Witnesses:
THOMAS H. UPPERMAN,
A. B. STOUGHTON.